US008554715B2

(12) United States Patent
Kraaij et al.

(10) Patent No.: US 8,554,715 B2
(45) Date of Patent: Oct. 8, 2013

(54) ELECTRONIC DOCUMENT CLASSIFICATION APPARATUS

(75) Inventors: Wessel Kraaij, Rotterdam (NL); Stephan Alexander Raaijmakers, Amsterdam (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 289 days.

(21) Appl. No.: 13/125,701

(22) PCT Filed: Oct. 29, 2009

(86) PCT No.: PCT/NL2009/050654
§ 371 (c)(1),
(2), (4) Date: Jun. 22, 2011

(87) PCT Pub. No.: WO2010/050811
PCT Pub. Date: May 6, 2010

(65) Prior Publication Data
US 2011/0251989 A1    Oct. 13, 2011

(30) Foreign Application Priority Data

Oct. 29, 2008  (EP) .................................... 08167884

(51) Int. Cl.
*G06F 5/00*   (2006.01)
*G06N 5/00*   (2006.01)

(52) U.S. Cl.
USPC .............................. 706/50; 382/224; 707/705

(58) Field of Classification Search
USPC ......................................................... 706/50
See application file for complete search history.

(56) References Cited

U.S. PATENT DOCUMENTS

2009/0048990 A1*  2/2009  Gross ............................... 706/12
2009/0067729 A1*  3/2009  Turkelson et al. ............. 382/224

OTHER PUBLICATIONS

Aronow et al., "Automated Identification of Episodes of Asthma Exacerbation for Quality Measurement in a Computer-Based Medical Record", 19th Ann. Symp. on Computer Applications in Medical Care. AMIA, Inc., 1995, pp. 309-313.
Ciravegna et al., "User-System Cooperation in Document Annotation based on Information Extraction", Proc. 13th Intl. Conf. on Knowledge, Engineering and Knowledge Management (EKAW02) Lecture Notes on Artificial Intelligence, Oct. 2002, vol. 2473, pp. 122-137.
PCT/NL2009/050654 International Search Report, mailing date Nov. 12, 2009.

* cited by examiner

*Primary Examiner* — Kakali Chaki
*Assistant Examiner* — Kalpana Bharadwaj
(74) *Attorney, Agent, or Firm* — Waddey & Patterson, P.C.; Rebecca M. Barnett; Emily A. Shouse (57) ABSTRACT

The apparatus computes classification scores based on parameters that have been determined from documents. Each score is compared with a first and second threshold. Definite classifications are assigned when the score is above the highest threshold or below the lowest threshold and the documents are processed accordingly. If the score is between the thresholds the document is singled out for further inspection, for example by a human arbitrator, to assign a class. The first and second threshold are adapted automatically based on specified a minimum accuracy level for the classification and a training set. The apparatus uses this specified accuracy in a search for a combination of threshold values that optimizes classifier yield, in terms of a maximized fraction of patterns in a training set that need not be turned over for further inspection without definite classification. The search is subject to the condition that the combination of thresholds results in at least the specified accuracy over the training set.

8 Claims, 3 Drawing Sheets

ELECTRONIC DOCUMENT CLASSIFICATION APPARATUS

FIELD OF THE INVENTION

The invention relates to a document classification apparatus and a computer implemented method of classification. More generally, the invention relates to a pattern classifier apparatus and to a method of pattern classification.

BACKGROUND

Automated pattern classification is well known per se. It has been applied for example to the automatic classification of electronic documents, object recognition, detection of abnormal situations in manufacturing processes etc. It is known to use a scoring module in a pattern classification apparatus, typically implemented by means of a computer program, that inputs information measured from the object that has to be classified and computes a score for object from the measured information. The score is a quasi continuous value indicative of the likelihood that the object belongs to a class. Scoring modules may be optimized for specific pattern recognition tasks, using machine learning techniques applied to examples of patterns in combination with the classes that have to be assigned to the patterns.

Such a score is not yet a classification. Typically, the score for an object has to be compared to a threshold to determine whether the object belongs to a class. The use of a threshold introduces two types of errors: false positive errors and false negative errors, one type of error involving assignment of an object to a class when that object does not belong to the class, and a second type of error involving not assigning an object to a class when the object does belong to the class. The rate of false positive errors increases when the threshold is lowered, but when the threshold is raised the rate of false negative errors increases. An optimal selection of the threshold value balances these effects.

In another solution two thresholds may be used for a class: a first threshold to distinguish between scores of objects that will definitely be classified as belonging to the class and other objects, and a second threshold to distinguish between scores of objects that will definitely not be classified as belonging to the class and other objects. This results in a category of objects that is neither definitely assigned to the class nor definitely not assigned to the class. Such objects may be indicated for further inspection by a human inspector to assign the object to the class or not, or to a more refined but more expensive automated classifier for doing so.

One problem of this type of classification involves the selection of the threshold(s). User input is indispensable at this point, because only the context of use of the classification can determine how the costs of false positive errors and false negative errors and human inspection should be balanced. However, users typically cannot oversee the consequences of the selection of a threshold value, especially if a plurality of thresholds has to be selected. This makes the selection of thresholds a cumbersome process that often results in suboptimal threshold selection.

A statistically based text classification system is mentioned in an article by David B. Aronow et al, titled "Automated Identification of Episodes of Asthma Exacerbation for Quality Measurement in a Computer-Based Medical Record" and published in the Proceedings of the 9th Annual Symopium on Computer Applications in Medical Care. Toward Cost-Effective Clinical Computing, by Hanley & Belfus Philadelphia Pa. 1995 pages 309-313 (EPO reference XP002521603).

Aronow et al. classify texts about patients to determine whether patients suffer from exacerbated asthma or not. Each text is assigned to one of three classes: positive, negative and uncertain. This was done by assigning weights to the document, computed from detected features in the documents and feature weights associated with these features. The weights were compared with a positive bin cut off and a negative bin cut off threshold to assign the texts to the classes. The texts that were classified as uncertain had to be scored by hand. This burden was reported to be reduced by 45%.

Aronow et al. mention that the document weights were determined from a training set of texts that were known to be positive and negative so that no more than a predetermined percentage of negative texts were classified as positive and no more than a predetermined percentage of positive texts were classified as negative. A target percentage of 10% is mentioned.

Aronow et al. do not consider the percentage of texts that are classified as uncertain in the selection of the weights: only percentages of false positive and false negative classifications are used. The percentage of positives texts in the training set that were not classified as positive is not used to determine the weights, nor is the percentage of negative texts that were not classified as negative. By using only percentages of false positives and false negatives the positive bin cut off and a negative bin cut off can easily be set. However, if the percentage of texts that are classified as uncertain would also be used to select the cut offs, no unambiguous way of selecting the cut offs exists. Nor do Aronow et al. suggest how this can be done.

SUMMARY

Among others, it is an object to provide for an improved document classifier apparatus that provides for automated threshold selection with a minimum of user input.

Among others, it is an object to provide for an improved computer implementable pattern classification method that provides for automated threshold selection with a minimum of user input.

An apparatus is provided as set forth in claim 1. This apparatus requires the user to specify a minimum accuracy level for the classification. The apparatus uses this specified accuracy to control execution of a search for a combination of effective threshold levels that optimizes classifier yield, in terms of a maximized fraction of patterns in a training set that need not be turned over for further inspection without definite classification. The search is executed subject to the condition that the combination of effective threshold levels results in at least the specified accuracy over the training set.

Methods and modules for executing a search in a specified search space given a score function for elements of the search space and conditions applicable to the elements are known per se. As is well known such methods may be used to identify an element of the search space that both satisfies the conditions and maximizes the score function. In the present case such a method is applied to a search space with elements that are combination of threshold values, a score function that is the classifier yield and the condition is that of providing at least the specified accuracy.

BRIEF DESCRIPTION OF THE DRAWING

These and other objects and advantageous aspects will become apparent from a description of exemplary embodiments, using the following figures.

DETAILED DESCRIPTION OF EXEMPLARY EMBODIMENTS

Figure 3:
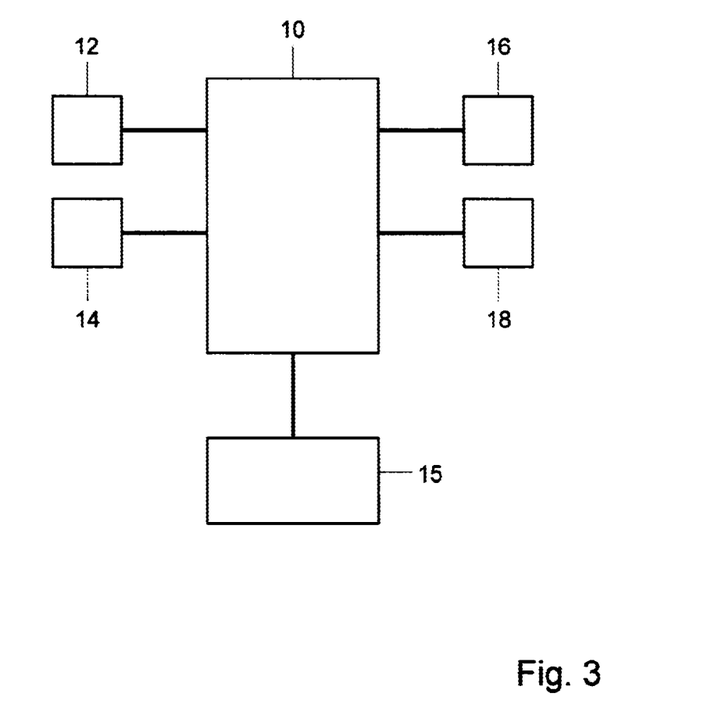
FIG. 3 shows a pattern classifier apparatus

In an exemplary embodiment the apparatus is implemented using a computer, programmed with a feature extraction program, score computing program, a threshold comparator and a threshold determination program. FIG. 3 shows an embodiment wherein in addition to computer 10, the apparatus comprises a storage device 15 for storing electronic documents and a program to process the electronic documents to extract parameter values that are descriptive of the documents. As used herein "parameters" may be integer numbers (e.g. numbers represented by at least eight bits), other numbers, vectors of numbers, binary values, input classification values, etc. The programs for the computer are software modules that may be stored on a computer readable medium such as a magnetic or optical disc, or they may be transmitted as messages over a network. Optionally, the apparatus may comprise one or more sensors 12 to measure values of parameters of an object to be classified. A camera may be used as a sensor for example, or sensors to monitor parameters of a manufacturing process. In another embodiment the apparatus has an input interface 12 to enter parameters that have been determined for an object.

In an embodiment feature extraction may involves counting the number of times that various words are used in a document that has to be classified, or statistics of other document features. In other embodiments feature extraction may involve measuring properties of the object to be classified.

Score computation from parameters of an object is known per se. In an embodiment computation of scores may involve weighted addition of the extracted parameters for example. Typically the score is a number from a quasi continuous range e.g. a numbers represented by at least eight bits. Threshold comparison comprises comparison of the computed score S with a first and second threshold T1, T2. If the computed score S exceeds the first threshold T1 the comparator signals that the object belongs to a class. If the computed score S is below the second threshold T2 the comparator signals that the object does not belong to the class. As will be appreciated, to decide about comparison with the two thresholds, a single comparison may suffice, if a first comparison shows that the score is above the highest threshold or below the lowest threshold. Dependent on these signals various actions may be taken. For example, a logic storage location (e.g. a directory) for storing a classified document may be selected dependent on the signals. In another example a stored list of classified objects may be updated by entering a reference to the object dependent on the signal. In another embodiment, further processing of the document in an optional further processing unit 16 may be triggered when the score is above the first threshold and the document may be discarded or archived if the score is above the second threshold.

If the score S is between the first and second threshold T1, T2, the comparator signals that further inspection of the object is needed. An output program may be used to display information about the object to a human user at an output device 16, dependent on this signal and to receive back an input about the classification. In an embodiment this input may be used to control further processing, for example by applying either the further processing action to the object that is defined for a score above the first threshold or applying the action defined for a score below the second threshold, dependent on whether the input indicates that the object belongs to the class or not.

The threshold determination program determines the first and second threshold value T1, T2 for use in the threshold comparator. For this purpose the threshold determination program is provided with a minimum accuracy value MIN received from a user input device 14 and with a set of training examples, each associated with a "ground truth" classification that should be assigned to the example.

In order to determine the thresholds, the score computation program is applied to the training examples to determine score values S for the examples. Given a first and second threshold value T1, T2 the score S for a training example and the "ground truth" classification of the training example, it can be determined for each example which of the following conditions applies

|  | assigned class: "+" | assigned class: "−" | assigned class: "?" |
| --- | --- | --- | --- |
| ground truth: "+" | TP | FN | M |
| ground truth: "−" | FP | TN |  |

Herein the assigned class of the training example is "+" if the score for the example exceeds the first threshold, the assigned class is "−" if the score is lower than the second threshold and the assigned class is "?" otherwise.

The threshold determination program counts the number of examples that satisfy the different conditions TP, FP, FN, TN and M. For brevity these counts will also be denoted by TP, FP, FN, TN and M. From these counts an accuracy and a yield are defined according to $$\text{accuracy} = (TP+TN)/(TP+TN+FP+FN)$$

$$\text{yield} = (TP+TN+FP+FN)/(TP+TN+FP+FN+M)$$

It may be noted that the accuracy and yield values that are defined in this way depend on the threshold values T1, T2 and the scores S of the examples. The threshold determination program searches for a combination of threshold values T1, T2 that among all possible threshold values result in a maximum value of the yield computed from the training set, subject to the conditions that the computed accuracy for the training set is at least equal to the minimum accuracy value MIN received from the user input. These threshold values are fed to the threshold comparator and used for subsequent pattern recognition. In this way the user needs to specify only one meaningful parameter, the minimum accuracy in order to enable the threshold determination program to provide the first and second threshold.

Methods, algorithms and modules, such as software modules, for executing a search in a specified search space given a score function for elements of the search space and conditions applicable to the elements are known per se.

These features specify the implementation of the search and not just the result of the search. As is well known such search methods may be used to identify an element of the search space that both satisfies the conditions and maximizes the score function. In the present case such a method is applied to a search space with elements that are combination of threshold values, a score function that is the classifier yield and the condition is that of providing at least the specified accuracy.

Although examples are described wherein the threshold values are selected directly, it should be understood that changing the definition of the score with a factor or adding a constant to the definition of the score can be used to achieve the same effect as making certain changes in the threshold levels. All change or determination that has the same effect as directly changing or determining threshold values, including such direct changes or determinations, will be referred to herein as a change or determination of an "effective threshold level" or effective level of the threshold, or more briefly as changes or determination of the threshold level.

Any type of search algorithm may be used, for example an exhaustive search algorithm wherein all possible combinations of first and second threshold values on a grid of threshold values are tried to determine the desired combination, but other types of search algorithm may work equally well. Although an example has been described with a specific formula for the accuracy or performance, it should be appreciated that alternatively other formulas may be used, any formula for the accuracy or performance may be used wherein increasing TP and TN contribute to increased accuracy, and/or wherein increasing FP and FN contribute to decrease accuracy.

Although an example has been described with a single training set, it should be appreciated that other forms of training may be used. For example, ongoing adaptation of the thresholds may be used, wherein the training set is progressively adapted.

Although an example has been given for the case of classification with a single class (effectively defining two classes, of patterns that do and do not belong to that class respectively), it should be appreciated that a similar technique may be applied to classification using a larger number of classes.

This may be done using classifier stacking for example, wherein successive classifiers are used to make successively more refined class distinctions between classes identified by earlier classifiers. Thus, if a classifier is used to assign an object to a class A or not, the next classifier may be used to assign the object to different sub-classes B of that class and/or different subclasses B' of objects that do not belong to the class. Class A may be a single class that can be an output of the stacked classification or a group of classes that need to be distinguished to obtain an output of the stacked classification. In each of at least part of these successive classifiers a comparison with respective pair of a first and second threshold may be used, in order to distinguish between objects that can be definitely classified and objects that need further inspection. When stacked classifiers are used the threshold determination program may be configured to receive minimum accuracy values for each of at least part of the classifiers in the succession and to search for first and second threshold pairs for each of these classifiers that maximize yield subject to the specified minimum accuracy. In another embodiment, a single minimum accuracy input from a user may be used for all searches for threshold pairs.

The training sets may be adapted per classifier. For selecting the thresholds for the first classifier a complete training set may be used, wherein "ground truth" classifications of different classes may be combined to define an overarching class if the first classifier serves to distinguish patterns from such an overarching class from other patterns. For selecting the training sets for subsequent classifiers subsets of the training set may be used, containing patterns that must be distinguished by these classifiers.

The importance of yield and accuracy will be further discussed in the following. This shows that that maximum yield subject to minimum accuracy is a good criterion for classification quality when "difficult" patterns can be turned over for inspection. This discovery is put to practical use to improve control of a classifying apparatus, providing for reliable automated selection of thresholds with less user input.

1 Introduction

The evaluation practice of information processing tasks such as classification, detection and ranking is a non-trivial issue, where no ideal recipe exists. Evaluation is either tailored toward component benchmarking or can be focused on end-to-end user experience. The component evaluations have their roots in the Cranfield Information Retrieval experiments that were a model for the successful TREC evaluations. These batch style experiments have for a long time focused on automatic only experiments, where human involvement is separated as much as possible from the actual experiments in order to avoid inter user variability and completely focus on the actual system component under scrutiny. Such batch style experiments have been attractive for IR researchers and even inspired evaluations in other communities such as natural language processing, since experiments were easy to conduct, and also very economic because humans were excluded from the loop (except for creating the ground truth). Still many researchers felt that these studies were limited, since they failed to model a real search process.

The component based evaluation which is the model for TREC is sometimes referred to as intrinsic evaluation in contrast to an evaluation where the component's performance is measured in the user context (extrinsic). When evaluating a complete system, intrinsic evaluation approximates performance evaluation and extrinsic evaluation is related to adequacy measurement [3]. In such a task based evaluation, factors such as usability play a crucial role. Performance measurements are usually aimed at comparing systems, whereas adequacy measurements focus more on the usability and practical use for an end user.

In many scenarios, the classification accuracy of a machine learning based classification system is not sufficiently high, since the tasks at hand are difficult. We propose that for these scenarios, systems can still successfully be deployed if only the "easy cases" are classified automatically. In such a deployment scenario, quality standards can still be met, whilst reducing (and not completely replacing) the manual workload.

The objectives of this paper are two-fold:

1. Introduce a novel ensemble of classifier evaluation measures which can evaluate the deployment of a classifier which only partially replaces human labeling.

2. Develop a ternary classifier that can operate at a pre-specified accuracy by forwarding "difficult" items for manual processing.

In this paper we propose a novel ensemble of evaluation measures for classification tasks that can be used for component evaluations. The distinguishing characteristic of this new ensemble is the fact that both measures (accuracy and yield) are motivated from the task viewpoint and directly relate to potential cost savings in terms of reduced manpower.

TABLE 1

Classification contingency table. Precision is defined as TP/(TP + FP) and recall is defined as TP/(TP + FN).

|  | assigned class: "+" | assigned class: "−" |
|---|---|---|
| ground truth: "+" | TP | FN |
| ground truth: "−" | FP | TN |

The structure of the remainder of the description is as follows: in section 2 we give a formal definition of the new ensemble of evaluation measures and discuss the relationship of these measures with operational characteristics of an abstracted workflow (an office where analysts manually label documents). Section 3 illustrates the ensemble of measures by reporting experiments concerning automatic detection of domestic violence cases in police files and a spam detection task. Section 4 describes the ternary classifier architecture. Section 5 presents two experiments that illustrate the value of the evaluation method and the ternary classifier. The paper concludes with a discussion section.

2 Classifier Accuracy and Classifier Yield

Several evaluation measures dominate the field of component based evaluation for classification and ranking tasks. The field of information retrieval evaluation popularized the precision and recall measures. These are set based measures which can best be visualized by looking at a contingency table (Table 2). Whereas the original precision and recall measures are hardly used anymore in IR (instead mean average uninterpolated precision is the norm for ranking tasks), they are regularly reported for classification experiments. Precision and recall have the desirable property that they relate well to intuitive characteristics of quality. Better systems have higher precision and or recall values. A disadvantage of precision and recall is that the test set must be a representative sample of the real class population. An opposite approach is to quantify the error rates of a classifier, where a better system has smaller error rates. For a binary classifier scenario both type I and type II error rates (false alarms and misses) can be measured independently from the actual class distribution in the test set.

Precision is a measure of fidelity and is inversely related to type I errors (false positives). Recall can be seen as a measure of completeness, being inversely related to type II errors (false negatives). An important nuance to make here is that fidelity and completeness are defined with respect to the positive class label, i.e. the task modeled is correctly identifying items with a positive class label. Precision and recall can be combined into a single measure F_beta[7], which helps to compare systems at a certain operating point (usually precision and recall are considered equally important).

Another measure that is often reported for classifier evaluation experiments is classifier accuracy. This is a fairly intuitive measure for classification quality provided the prior class distribution is fairly homogeneous. The accuracy quantifies the accuracy of the average decision made by the classifier. This averaging behaviour makes accuracy highly sensitive to a skewed distribution of class priors (imbalanced natural class distribution). This means that it is difficult to interpret accuracy results unless the class distribution of the test set is known. A simple majority classifier can have a very high accuracy for skewed distributions.

A subclass of typical real-life classification problems are detection tasks. These can be characterized the capabilities of the classifier at hand. Typical application scenarios are binary detectors. In our approach, a binary classifier is combined with a meta-classifier mapping all decisions of the first classifier that do not meet a pre-specified confidence value to a third category: for manual inspection. The classifier combination can be seen as a ternary classifier, which can now be evaluated in terms of its yield at a pre-specified confidence level, where yield is defined as the proportion of observations that can be classified automatically with a minimum pre-specified accuracy. In a way, accuracy and yield model the same intuitive aspects that underly precision and recall, classifier accuracy is a way to measure the fidelity of the classification task and classifier yield can be viewed as a measure for classifier completeness at the task level. The intended use of the ensemble {accuracy, yield} is to measure the classifier yield at a fixed (minimum) level of accuracy. As an example, we could be interested in the yield of a biometric detector at an accuracy level of 99%. as binary classification tasks with a skewed natural class distribution i.e. the negative cases are much more common than the positive cases. We are aware of the problems that these kinds of tasks pose for training classifiers and for designing benchmark data sets (some of these issues were briefly introduced above). A training data set needs to contain sufficient positive examples of a relatively rare phenomenon. The test data set however should contain enough negative examples in order to have a proper estimate of false positives. These are all important issues for the design of evaluations, but they are not the focus of this paper. Our claim is that just stating that a classifier has a certain F1 value or accuracy cannot be translated in terms of its potential for operational deployment. Also, in some scenarios the problem is so difficult that state of the art classifiers do not meet the minimum quality requirements that have been defined for this task. Still, if we could modify the workflow of human analysts and the classifier architecture in such a way that part of their work could be automated, while meeting the minimum quality requirements, it is easy to define a business case. We therefore propose a novel and intuitive way to quantify the utility of a classifier in cases where classification is applied in order to partially replace human labour, but accuracy requirements exceed

TABLE 2

Classification contingency table for the ternary classifier

| | assigned class: "+" | assigned class: "−" | assigned class: "?" |
|---|---|---|---|
| ground truth: "+" | TP | FN | M |
| ground truth: "−" | FP | TN | |

Table 2 shows a modified contingency table where the classifier can assign one additional label: "?" (queue for manual inspection). Now accuracy can be defined as usual:

$$\text{accuracy} = \frac{TP + TN}{TP + TN + FP + FN} \quad (1)$$

and yield can be defined as:

$$\text{yield} = \frac{TP + TN + FP + FN}{TP + TN + FP + FN + M} \quad (2)$$

It is easy to see that the classifier yield is just the proportion of observations that is not labeled as M.

3 Related Work

As far as we know, the proposed ensemble of measures (yield at minimum accuracy) is a novel way of measuring the quality of a classifier. There are several established evaluation traditions that have some elements in common. The TREC filtering task used a linear utility function for the adaptive filtering task, which is a rather complex classification task where a system can use feedback in order to set its optimal operating point (decision threshold) in a dynamic fashion. The linear utility is defined as [4]:

linear utility=alpha×$TP$+beta×$FP$+gamma×$FN$+delta× $TN$ (3)

This is essentially a cost function, where parameters must be chosen to model a particular user scenario. Choosing four parameters (which can be negative) is non-trivial, and therefore in our view not so intuitive. Linear utility could be extended to handle the six-cell contingency table corresponding to our ternary classifier, but that would mean six parameters to choose. A more elegant way to model the cost of running a certain classifier on a dataset is the family of cost functions that were developed in the Topic Detection and Tracking (TDT) framework [2]. The basic cost function is defined as follows:

$$\text{detection cost} = C\text{Miss} \times P\text{Miss} \times PT + CFA \times PNT \times PFA \quad (4)$$

where CMiss and CFA are fixed cost parameters that tax type II and type I errors respectively, PMiss and PFA are the probabilities (normalized counts) of type II and type I errors (false alarms), and PT=1−PNT is the prior probability of a positive class label (T=target). Usually, the detection cost is measured at different levels of Miss/False Alarm trade-off by threshold sweeping, thus generating a detection cost curve. The detection cost function is motivated by the desire to quantify different types of error and sum the complete cost of a detection task for a certain data collection (taking into account the relative proportion of the class population sizes). However, the detection cost is based on a fully automatic scenario. Incorporating the cost of manually assessing observations would make the detection cost function less intuitive.

Another common aggregate statistic for measuring classification is the AUC (area under curve). AUC is the ROC (receiver operating curve) equivalent of mean average uninterpolated precision. ROC is based on a plot of the true positive rate (recall) versus the false positive rate. ROC curves are less optimal for
unbalanced classes, since the interesting part of the curve needs zooming [5]. In principle it should be possible to use our ternary classifier architecture for a yield fixed AUC evaluation scenario, although AUC is not a very intuitive quality measure for non-experts.

Finally, a common evaluation procedure for biometric detectors is to measure the false alarm rate (FAR) at a fixed maximum false reject (miss) rate (FRR) or vice versa [1]. Our proposed procedure is similar in the respect that a certain operating point is pre-defined in order to compare systems. The pre-defined operating point provides an "anchor" in the recall-precision trade-off and simplifies evaluation to a single measure just like Fbeta defines a certain operating point in the precision recall space.

4 An example Ternary Classifier

The experiments that were carried out to illustrate the evaluation procedure were based on a two-level classifier architecture. The first level classifier was implemented by an information diffusion kernel machine. This kernel machine presupposes L1-normalized data (relative frequencies) and estimates similarity between documents using a geodesic distance measure applied to the Riemannian manifold that represents this data [8]. The (parameter free) diffusion kernel machine was modified to provide a posterior probability as output in addition to the predicted class [6]. The mapping function was trained on a separate development data set. The posterior probability (Platt score) was subsequently used as an input for a second classifier that was implemented by a decision rule based on two thresholds theta_l and theta_u. The decision rule was defined as follows:

$$\text{prediction}(\sigma) = \begin{cases} + & \text{if } \sigma = > \theta_u \\ M & \text{if } \theta_l < \sigma < \theta_u \\ \cdots & \text{if } \sigma <= \theta_l \end{cases} \quad (5)$$

The thresholds maximizing the yield while reaching the minimum accuracy were computed through exhaustive search by a 2 dimensional parameter sweep (for both threshold values) on a development set.

The development data set for parameter training should be chosen carefully since we assume that the class distribution is the same in the development set and the test set and that the Platt score distribution is more or less similar in the development and test set, for both classes.

5 Experiments

We will illustrate the use of the evaluation procedure by two experiments. The first experiment concerns the detection of domestic violence in police files. The second experiment is about spam detection 5.1 Detection of Domestic Violence Taking adequate action in cased of domestic violence is one of the focal points of the regional police force Amsterdam-Amstelland (RPAA). Recognition of domestic violence as such in incident reports is not an easy task, since domestic violence has a complex legal definition where several conditions need to be checked. Domestic violence is not always marked as such in the reports by the registrating police officer, so it is desirable to recognize these cases post-hoc automatically. The current practice for filtering out domestic violence cases from the full database of incident reports is based on a rule based system. Rules are created and maintained manually. Unfortunately the current rule set creates a very high number of false positives, which means that all filtered cases currently are subjected to a manual check. In order to minimize the number of manual checks, two classifiers were compared on site. A baseline rule based classifier1 using handcrafted thesauri (more elaborate and refined than the incident-report filtering system) and the ternary classifier discussed in Section 4. The ternary classifier architecture used the same feature set as the baseline classifier. Example features are my father beats and my uncle abducts, where verb forms were normalized.

Figure 1:
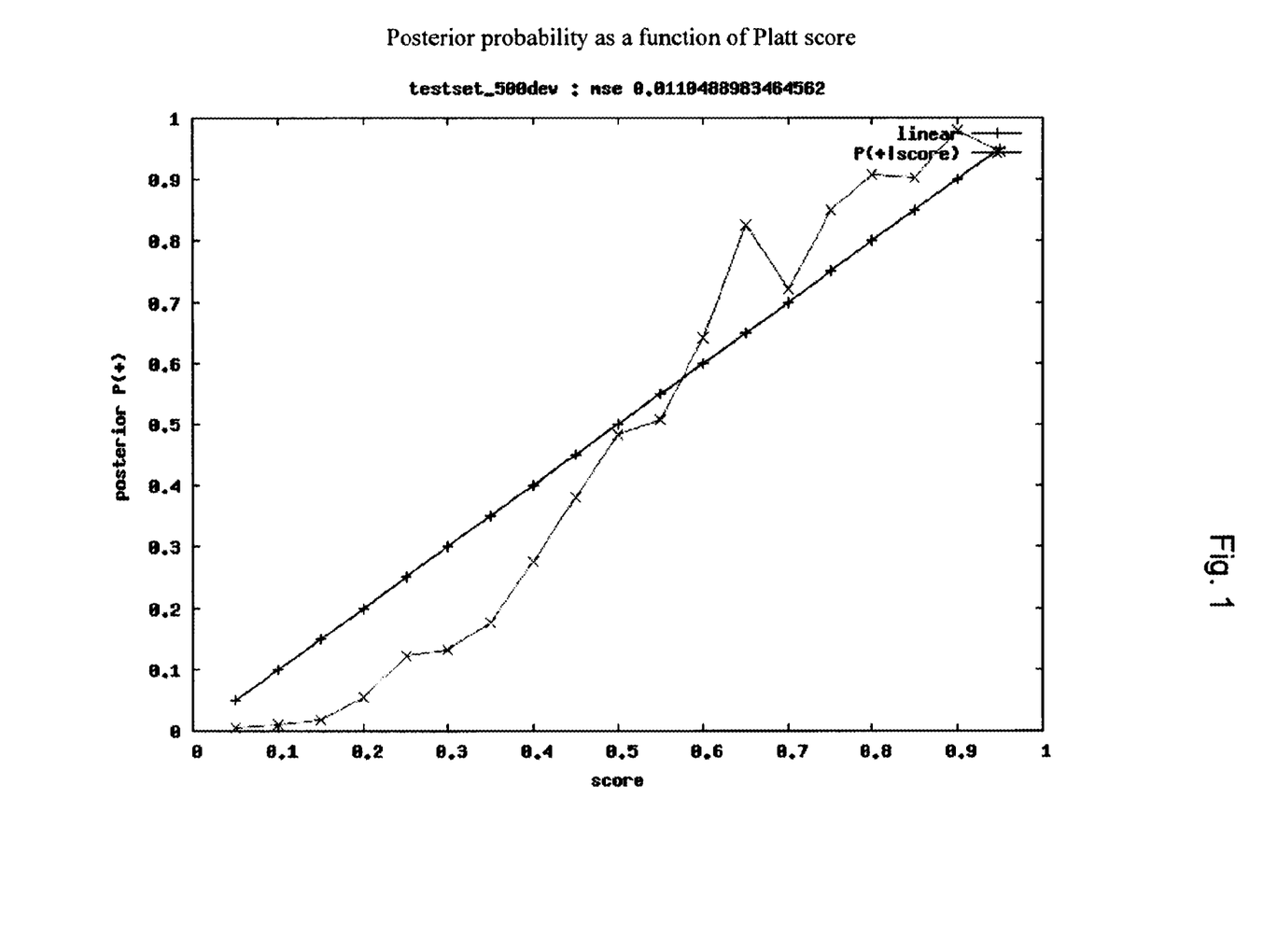
FIG. 1 shows posterior probability as a function of score

The evaluation procedure based on accuracy and yield was applied in order to provide simple intuitive statistics that would enable a transparent interpretation of what a deployment of an automatic classifier would mean in terms of reduction of processing time, whilst maintaining the required quality level. The following datasets were used:

training set A collection of 1736 reports, manually re-checked. 1101 positive cases. A random sample of 200 case files was used for development, the rest (1536) for training.
test set A held out collection of 2291 reports, labeled by registrating officer 0.541 positive cases As a first step the diffusion kernel and Platt function were trained on the development set. In a second step, optimal upper and lower decision score threshold were computed using the development data with a pre-specified accuracy>0.90. Table 5.1 lists the evaluation results (measured in terms of accuracy) for the baseline rule based ranking classifier and the diffusion kernel machine. The more advanced classifier architecture has a superior performance thanks to its generalizing capabilities. Still the accuracy of the diffusion kernel machine is too low for deployment at RPAA. In a second step, score thresholds are learned on a development set2 to isolate those reports where the classifier decision is based on a low confidence score. These reports can then be forwarded for manual inspection. As an illustration, FIG. 1 shows the probability that the classifier is correct as a function of its score.

TABLE 3

Results for the detection of domestic violence
on the full test set using a single classifier

|  | accuracy | yield |
|---|---|---|
| baseline classifier | 0.73 | 1 |
| diffusion kernel machine | 0.84 | 1 |

TABLE 4

Results for the detection of domestic violence
experiment using the ternary classifier

|  | accuracy | yield |
|---|---|---|
| development set | 0.90 | 0.70 |
| full test set | 0.92 | 0.86 |
| test set sample A | 0.93 | 0.86 |
| test set sample B | 0.92 | 0.89 |
| test set sample C | 0.93 | 0.86 |

The important question is whether decision thresholds can be learned and whether they are robust. Table 5.1 lists the accuracy and yield of the ternary classifier for development and test sets. As an additional diagnostic, three random samples of the test set (sample size=1000) were evaluated. The obtained accuracy on the test set is somewhat lower. This could be explained by the fact that this test set lacked a second manual label check. Still the classifier is able to classify more than 85% of the cases with an accuracy of 92%. This means, that the ternary classifier meets the accuracy requirements, while keeping the necessary manually labeling step to under 15% of the cases.

The results at various subsamples demonstrate the robustness of the parameter settings.

5.2 Spam Detection

As a second experiment we chose a spam detection task, available from the ECML 2006 Discover Challenge http://www.ecmlpkdd2006.org/challenge.html. The challenge consists of two separate tasks: a task (A) with many user-specific training data addressing user-specificity of the found solution, and a task (B) with a limited amount of data per user, addressing generalization over users. In this work, we limit ourselves to task A. All data sets consist of word/frequency pairs, which can be easily normalized to L1.

Task A models three users. For each user there are 4000 labeled training email messages and 2500 for evaluation. We divided the evaluation sets in a development set of 500 emails and the remaining 2000 for evaluation.

TABLE 5

Results for the detection of spam emails
using a binary and ternary classifier

|  | #pos dev | #pos test | binary classifier accuracy | ternary classifier accuracy | ternary classifier yield |
|---|---|---|---|---|---|
| user 0 | 248 | 1002 | 0.62 | 0.89 | 0.19 |
| user 1 | 241 | 1009 | 0.65 | 0.90 | 0.39 |
| user 2 | 268 | 982 | 0.78 | 0.91 | 0.69 |

Table 5 lists the results of the spam detection experiment. The first two columns give the number of spam messages in the development and test set respectively. The third column gives the accuracy of the standard binary classifier (diffusion kernel machine). The fourth and fifth column give results on accuracy and yield when the ternary classifier's thresholds have been set for a minimum accuracy level of 0.90 using the development subsets. The desired accuracy (0.9) can be achieved for about 20-70% of the email messages depending on the user, making it a much harder task than the domestic violence detection.

Figure 2:
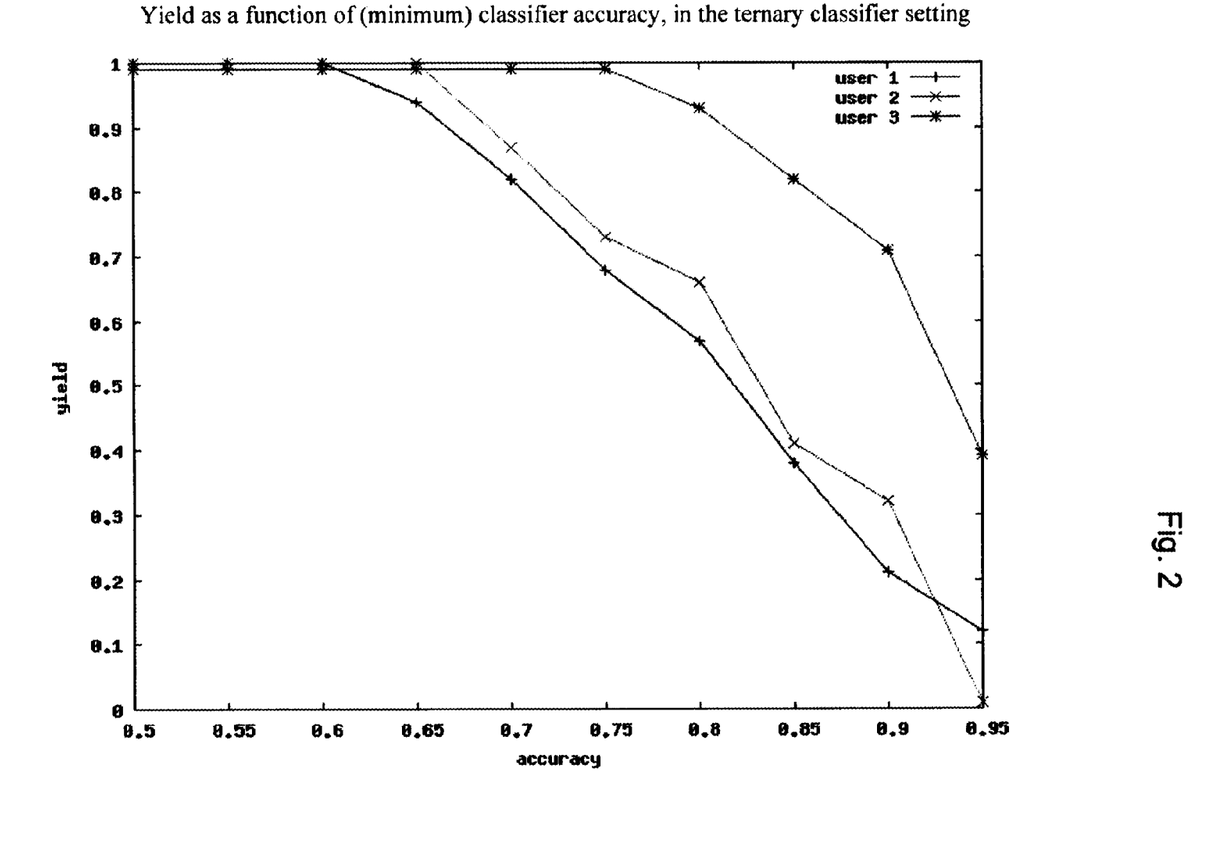
FIG. 2 shows yield as a function of minimum accuracy

FIG. 2 illustrates the optimal operation curves for each user mailbox in a so-called yieldplot, where the classifier yield is plotted as a function of the desired accuracy level.

6 Discussion and Conclusions

We have presented a new ensemble of evaluation measures for a setting where a classifier is used to partially replace human labeling effort. The measures accuracy and yield relate well to a more extrinsic view on evaluation, where the focus is on cost savings. Accuracy and yield can be seen as workflow oriented measures for 'fidelity' and 'completeness'. The simplicity of this approach does have some shortcomings. Indeed accuracy as an aggregated measure hides the different sources of classification quality. it is well known that accuracy is sensitive to class imbalance. An alternative ensemble based on false alarm rate, false reject rate and yield would solve this problem. However, this ensemble might be less intuitive for non-experts.

A second insight is the concept of a ternary classifier, which is able to assess the confidence of its own decisions. Decisions below a certain confidence level can be forwarded to human experts, thereby reducing the error rate of the classifier. Our method estimated two posterior probability threshold levels. The experiments show that the yield accuracy plot makes it easy to use the ternary classifier in an operational workflow. Also, the ternary classifier can effectively forward difficult cases for human inspection.

In fact it is not essential that the classifier outputs true probabilities, it can be any monotonous increasing ranking function. As long as ranking values can be compared across collections, since the threshold values will always be optimized on a different data set than the test set.

There are several ways in which we plan to extend this research. We intend to look at the suitability of other (first level) classifier architectures, look at an ensemble of measures that makes a distinction between type I and type II error rates, and perform a more thorough analysis of the robustness of our parameter setting procedure.

In summary, we propose a novel and intuitive way to quantify the utility of a classifier in cases where automatic classification is deployed as partial replacement of human effort, but accuracy requirements exceed the capabilities of the classifier at hand. In our approach, a binary classifier is combined with a meta-classifier mapping all decisions of the first classifier that do not meet a pre-specified confidence level to a third category: for manual inspection. This ternary classifier can now be evaluated in terms of its yield, where yield is defined as the proportion of observations that can be classified automatically with a pre-specified minimum accuracy.

REFERENCES

[1] Ruud Bolle, Jonathan Connell, Sharanthchandra Pankanti, Nalini Ratha, and Andrew Senior. Guide to Biometrics. SpringerVerlag, 2003.

[2] Jonathan G. Fiscus and George R. Doddington. Topic detection and tracking evaluation overview. In Topic detection and tracking: event-based information organization, pages 17-31. Kluwer Academic Publishers, Norwell, Mass., USA, 2002.

[3] L. Hirschman and H. S. Thompson. chapter 13.1 Overview of Evaluation in Speech and Natural Language Processing. 1996.
[4] David A. Hull and Stephen E. Robertson. The TREC-8 filtering track final report. In Proceedings of TREC-8, 1999.
[5] Christopher D. Manning, Prabhakar Raghavan, and Hinrich Schtze. Introduction to Information Retrieval. Cambridge University Press, 2008.
[6] J. Platt. Probabilistic outputs for support vector machines and comparison to regularized likelihood methods. In A. J. Smola, P. Bartlett, B. Schoelkopf, and D. Schuurmans, editors, Advances in Large Margin Classiers, pages 61-74, 2000.
[7] C. J. van Rijsbergen. Information Retrieval. Butterworths, London, 1979.
[8] Dell Zhang, Xi Chen, and Wee Sun Lee. Text classification with kernels on the multinomial manifold. In SIGIR '05: Proceedings of the 28th annual international ACM SIGIR conference on Research and development in information retrieval, pages 266-273, New York, N.Y., USA, 2005. ACM.

The invention claimed is:

1. A document classification apparatus, comprising
a processor;
a score computation module configured to compute a score value from information obtained for a document to be classified;
a threshold comparator configured to perform a comparison to determine whether the score value is above a first threshold, below a second threshold or between the first and second threshold;
a further processing module configured to process the document dependent on the result of the comparison, the further processing module being configured to single out the document for further inspection to assign a class if the score value is between the first and second threshold;
a threshold determination module configured to determine the effective levels of the first and second threshold, based on an input minimum accuracy value and a set of training examples, by searching for a combination of effective thresholds levels that maximizes a yield over the training set while at least achieving said input minimum accuracy value, wherein the threshold determination module is configured to determine the yield according to yield=$(TP+TN+FP+FN)/(TP+TN+FP+FN+M)$ and the accuracy according to a function of TP and TN and/or FP and FN that increases with increasing TP and TN and/or decreases with increasing FP and FN, wherein TP and FP are counts of training patterns with a score value above the first threshold that are identified in the training pattern to belongs to a class and not to belong to the class respectively, wherein FN and TN are counts of training patterns with a score value below the second threshold that are identified in the training pattern to belongs to the class and not to belong to the class respectively, and M is a count of training patterns with a score value between the first and second threshold.

2. A document classification apparatus as claimed in claim 1, wherein the threshold determination module is configured to determine accuracy according to accuracy=$(TP+TN)/(TP+TN+FP+FN)$.

3. A document classification apparatus, as claimed in claim 1, wherein the score computation module is configured to compute a plurality of score values and the threshold comparator is configured to perform a plurality of determinations, each for a respective pairs of a first and second threshold, whether respective ones of the score values are above a first threshold, below a second threshold or between the first and second threshold of the pair, the threshold determination module configured to determine a plurality of the pairs of first and second effective threshold levels using said minimum accuracy for each of the determinations.

4. A computer implemented classification method, the method comprising
computing a score value from information obtained for an object to be classified;
determining whether the score value is above a first threshold, below a second threshold or between the first and second threshold;
applying further processing to the object dependent on the result of the comparison, singling out the object for further inspection to assign a class if the score value is between the first and second threshold;
determining effective levels of the first and second threshold based on an input minimum accuracy value and a set of training examples, by searching for a combination of effective threshold levels that maximizes a yield over the training set while at least achieving said input minimum accuracy value, the method comprising
counting template patterns to determine, for possible combinations of first and second effective threshold levels in the search, count values TP, FP, FN, TN and M, wherein TP and FP of training patterns with a score value above the first threshold that are identified in the training pattern to belongs to a class and not to belong to the class respectively, wherein FN and TN are counts of training patterns with a score value below the second threshold that are identified in the training pattern to belongs to the class and not to belong to the class respectively, and M is a count of training patterns with a score value between the first and second threshold, and
computing the yield in the search according to yield=$(TP+TN+FP+FN)/(TP+TN+FP+FN+M)$ and the accuracy according to a function of TP and TN and/or FP and FN that increases with increasing TP and TN and/or decreases with increasing FP and FN.

5. A method as claimed in claim 4, wherein the accuracy is determined according to accuracy=$(TP+TN)/(TP+TN+FP+FN)$.

6. A non-transitory computer program product, comprising a program of instructions for a programmable computer including a processor, which when executed by the programmable computer cause the programmable computer to execute the method of claim 4.

7. A non-transitory computer program product, comprising a program of instructions for a programmable computer including a processor, which when executed by the processor of the programmable computer cause the programmable computer to execute the method of claim 5.

8. A document classification apparatus, as claimed in claim 2, wherein the score computation module is configured to compute a plurality of score values and the threshold comparator is configured to perform a plurality of determinations, each for a respective pairs of a first and second threshold, whether respective ones of the score values are above a first threshold, below a second threshold or between the first and second threshold of the pair, the threshold determination module configured to determine a plurality of the pairs of first and second effective threshold levels using said minimum accuracy for each of the determinations.

* * * * *

UNITED STATES PATENT AND TRADEMARK OFFICE
CERTIFICATE OF CORRECTION

PATENT NO.       : 8,554,715 B2
APPLICATION NO. : 13/125701
DATED            : October 8, 2013
INVENTOR(S)      : Kraaij et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this

Fifteenth Day of September, 2015

Michelle K. Lee
*Director of the United States Patent and Trademark Office*